United States Patent [19]

Niemann

[11] 4,191,393
[45] Mar. 4, 1980

[54] BICYCLE LUGGAGE CARRIER ATTACHMENT ARRANGEMENT

[75] Inventor: Heinz Niemann, Herford, Fed. Rep. of Germany

[73] Assignee: ESGE-Marby GmbH & Co., Bielefeld, Fed. Rep. of Germany

[21] Appl. No.: 967,220

[22] Filed: Dec. 7, 1978

[30] Foreign Application Priority Data

Sep. 22, 1978 [DE] Fed. Rep. of Germany ... 7828291[U]

[51] Int. Cl.² .................... B62J 7/04; B62J 11/00
[52] U.S. Cl. .................. 280/289 A; 224/32 R; 224/39; 248/230
[58] Field of Search .............. 280/289 A, 289 R; 224/30 R, 30 A, 32 R, 32 A, 37, 38, 39; 248/230, 226.3

[56] References Cited

U.S. PATENT DOCUMENTS

| 2,043,041 | 6/1936 | Goeddeke | 248/226.3 |
| 2,536,570 | 1/1951 | Rehn | 224/32 R |
| 3,403,878 | 10/1968 | Opay | 224/30 R |

FOREIGN PATENT DOCUMENTS

| 716356 | 10/1954 | United Kingdom | 248/231 |
| 741010 | 11/1955 | United Kingdom | 224/39 |

Primary Examiner—John P. Silverstrim
Attorney, Agent, or Firm—Frishauf, Holtz, Goodman & Woodward

[57] ABSTRACT

To permit attachment of a cycle carrier universally to any type of cycle with a rear fork structure of different rear fork elements and of respectively different mutual spacings, two U-clamps 2 are provided, separately and independently positionable around the fork elements 1 of the cycle; preferably, the inner surface of the U-clamps, at least in the region of engagement with the fork elements is lined with a yielding cushioning material. Screws are passed through elongated openings 5 formed in each one of the legs 4 of the U-clamps 2 to attach the cross bar 7 of the cycle carrier to the clamps. Preferably, a back-up connecting strip is positioned against the legs of the U-clamps at the side remote from the attachment of the cycle carrier cross bar.

10 Claims, 4 Drawing Figures

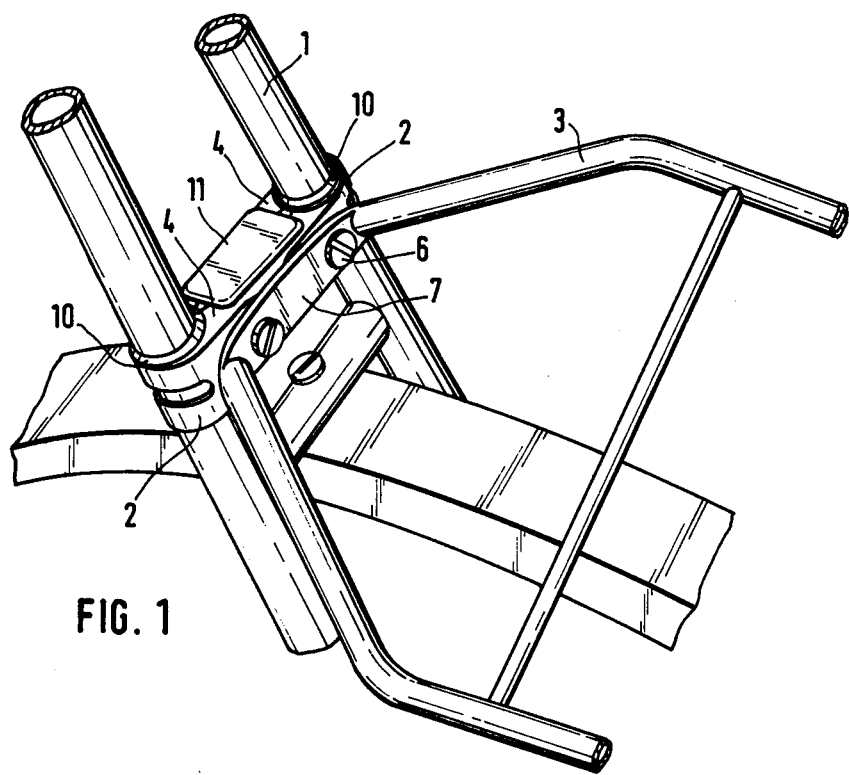
FIG. 1
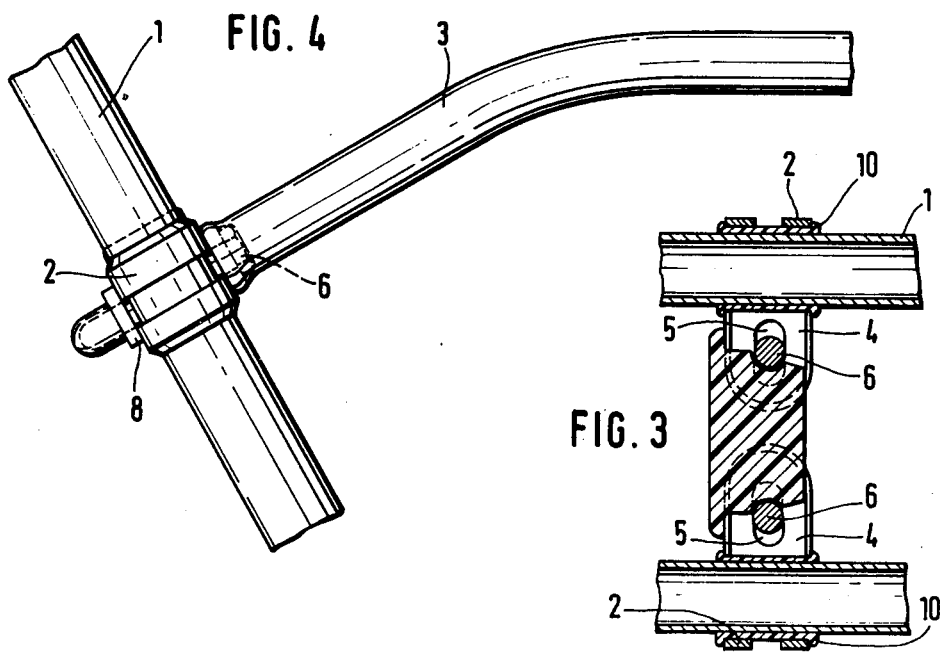

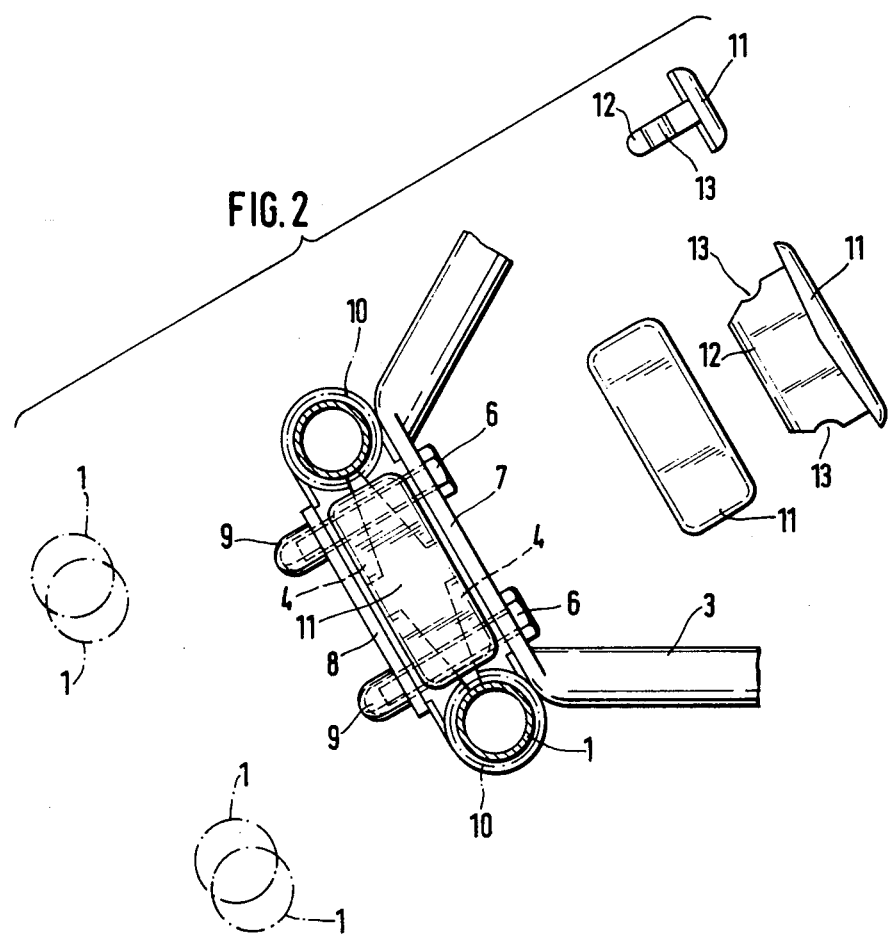

BICYCLE LUGGAGE CARRIER ATTACHMENT ARRANGEMENT

The present invention relates to an arrangement to secure a luggage carrier or luggage rack on the rear fork of a bicycle, and more particularly to such an arrangement which is versatile and permits secure attachment of a carrier to bicycles of different models, makes or sizes.

BACKGROUND AND PRIOR ART

It is customary to attach a bicycle carrier to the rear frame of a cycle by providing a strap on the carrier which is screwed to a strip of sheet metal, typically steel, formed with openings for attachment screws, which is slipped around the rear fork elements of a bicycle. Screws are then passed through a strap element of the carrier and the forward and rear part of the metal strip. When the bolts and nuts of the screws are tightened, the carrier is secured while, at the same time, the strips which are passed around the fork elements of the rear fork are clamped thereto. This arrangement has a disadvantage in that the luggage carrier, particularly if more heavily loaded, is apt to slip on the bicycle frame, since the attachment of the carrier to the rear fork elements usually leaves clearance between the screws, the metal strip and the tightening nuts. This attachment is unreliable, particularly when the cycle is subject to jarring or severe vibrations, and results in slippage of the attachment of the carrier to the bicycle. The arrangement is, additionally, suitable essentially only for bicycles to which it is matched, that is, in which the spacing between the elements of the rear fork of the bicycle is essentially constant, and the attachment strap is designed for use with just one type of bicycle having given spacing dimensions of the rear fork elements.

Another arrangement to secure a cycle carrier to a bicycle uses two strips, both formed with openings for attachment bolts and nuts. The strip which is remote from the cycle carrier is bent so that the bent ends at least partially surround the fork elements of the cycle. To attach a carrier with this arrangement to the rear fork of a bicycle, the carrier is first loosely attached to the cycle and then the bent-over strap is located opposite the carrier against the rear fork; both are then passed through matching openings and the portion of the strap and nuts placed thereon and the bolts are then tightened, tightening in turn the bent-over portions against the bicycle frame, and specifically against the rear fork elements thereof. This arrangement also does not ensure reliable attachment since the metal strap and the counter strap usually formed by the carrier itself can slip with respect to the bicycle frame; this arrangement has the additional disadvantage that it is suitable only for bicycle frame of predetermined fork spacing, to match the spacing of the bent portions of the strap and usually only for fork elements of a certain size which may not exceed a predetermined value since, otherwise, the bent-over ends will not fit around the fork elements.

THE INVENTION

It is an object to provide an attachment arrangement for bicycle luggage carriers which results in completely reliable attachment of the carrier to the rear fork elements, which is versatile and permits use of the attachment arrangement with many types of bicycles having forks of different spacing and different dimension.

Briefly, two round clamps are provided, the inner directing legs thereof having elongated openings through which the attachment screws may pass, such that the clamps can be located at selected distances — as determined by the bicycle. Preferably, a connecting plate is provided which connects the clamp elements. The elongated holes permit matching of the spacing the legs of the clamp elements to any specific bicycle.

Drawings, illustrating a preferred example, wherein:

FIG. 1 is a perspective view of the attachment arrangement, secured to the rear fork of a bicycle;

FIG. 2 is a partly exploded top view of the attachment arrangement;

FIG. 3 is a cross section taken longitudinally through the rear forks of a bicycle, and illustrating the connection arrangement; and FIG. 4 is a side view of the connection arrangement.

A luggage carrier 3, only shown in fragmentary form (FIG. 1) is secured to the rear fork of a bicycle by circular U-clamps 2. The rear fork elements 1 of the bicycle are surrounded by the clamps. The clamps are formed with two inwardly directed legs 4 which have longitudinally elongated openings 5 (FIG. 3) therein. Clamping screws or bolts 6 pass through the openings 5 to attach the usually flat end portion 7 of the carrier 3 to the clamps 2. A strap 8 is located at the side remote from the carrier 3 connecting the clamps 2, the bolts 6 passing through the strap 8. The bolts 6 are secured by nuts 9. The clamps 2 have inserts 10 of resilient material, so that the fork elements 1 are not damaged by the clamps.

When attached, the screws 6, together with the nuts 9 and the strap 8, clamp the clamps 2 to the fork elements 1 since, upon tightening of the screws, the legs 4 of the clamps 2 are compressed. Additionally, the carrier 3 is secured to the clamps 2 and is held in desired position with respect to the fork elements 1. The fork elements 1 are protected by the inserts 10 of resilient, yielding material; this material, for example a plastic, can easily be made with a non-slip surface towards the inside to additionally prevent slipping of the clamps 2 on the fork elements 1. This permits high loading of the carrier 3 without shift in position of the carrier with respect to the cycle frame.

The structure permits formation of the holes for the bolts 6, 9 in elongated form. The elongated holes 5 permit attaching the carrier to forks of bicycles of various types, various manufactures and sizes, and in which the fork elements have different distances from each other. The clamps 2, in other words, can be attached with respect to their mutual distance as desired, and as determined by the manufacture of the bicycle with which the carrier is to be used. The fork elements, from time to time, have different diameters, depending on manufacture and type. The inserts 10 can, therefore, be made of different thicknesses or in multi-layer form so that, by use of a suitable insert, or stripping a layer off the insert, the clamps 2 can be matched to the size of the fork elements 1 as well.

The left portion of the exploded view of FIG. 2 shows the extent with which the elongated holes 5 permit matching of the position of the clamps 2 to fork elements of different spacings.

The attachment arrangement consisting of two U-shaped clamps 2, as well as the strap 8, are constructed to be entirely symmetrical with respect to a plane extending at right angles to the attachment surface for the luggage carrier 3. This substantially simplifies assembly of the carrier to a bicycle as well as manufacture; the attachment arrangement does not have any specific left or right parts and can thus be used in any suitable position with respect to the elements 1 of the rear fork of the cycle. This system additionally simplifies stocking of parts.

Preferably, and for esthetic reasons, as well as to keep out dirt and moisture, a top cover plate 11 is provided to close off the space between the U-shaped clamps 2. This cover plate, best seen in the exploded right-hand portion of FIG. 2, consists of a covering plate element to which a wall-like projection 12 is attached. The projection 12 is formed with lateral notches 13, preferably deep enough to fit within the maximum in-out positioning of the bolts 6 through the elongated holes 5 in the U-clamps 2. The notches 13 are so arranged that the shafts of the connecting bolts 6 can fit therein when the plate 11 is fitted in the space between the U-shaped clamps 2. Preferably, the cover 11 together with the projecting wall 12 is formed as a unitary plastic molding, which is deformable to accept the screws and which can readily be cut with a knife to fit between narrow rear forks of a bicycle, for example.

Various changes and modifications may be made within the scope of the inventive concept.

I claim:

1. Attachment arrangement to attach a luggage carrier to the fork elements (1) of the rear fork of a bicycle frame, in which the carrier (3) has a cross bar (7) formed with screw holes therethrough, said arrangement comprising
    two separate U-shaped clamps (2), each formed with elongated openings (5) in the legs (4) of the U for placement of the U-shaped clamps, individually, around the fork elements (1);
    and threaded bolts (6) passing through said openings and through the screw holes of the cross bar (7) of the carrier, the elongated openings permitting adjustment of the U-shaped clamps with respect to the fork elements of different sizes and of respectively different mutual spacing.

2. Arrangement according to claim 1, further including a connecting strap (8) having openings therethrough for positioning at the sides of the legs (4) of the U-shaped clamps (2) remote from the side against which the cross bar (7) of the carrier (3) is placed, said connecting strap (8) connecting the U-shaped clamps, the openings being formed for alignment with the screw holes of the cross bar (7) to receive the bolts (6) therethrough.

3. Arrangement according to claim 1, further including inserts (10) of yielding material at the inner portions of the U-clamps (2).

4. Arrangement according to claim 3, wherein the yielding inserts are formed in a set of mutually different thicknesses.

5. Arrangement according to claim 3, further including a connecting strap (8) having openings therethrough for positioning at the sides of the legs (4) of the U-clamps (2) remote from the side against which the cross bar (7) of the carrier (3) is placed, said connecting strap (8) connecting the U-clamps, the openings being formed for alignment with the screw holes of the cross bar (7) to receive the bolts (6) therethrough.

6. Arrangement according to claim 1, wherein the U-clamps (2) are symmetrical with respect to a plane perpendicular to the attachment plane of the carrier.

7. Arrangement according to claim 6, further including a connecting strap (8) having openings therethrough for positioning at the sides of the legs (4) of the U-clamps (2) remote from the side against which the cross bar (7) of the carrier (3) is placed, said connecting strap (8) connecting the U-clamps, the openings being formed for alignment with the screw holes of the cross bar (7) to receive the bolts (6) therethrough;
    and said connecting strap (8) is also symmetrical with respect to said plane.

8. Arrangement according to claim 7, further including a cover plate (11) fitting over the space between the legs (4) of the clamps (2);
    and a projection extending approximately at right angles from the cover plate (11) and formed with lateral notches (13) located in alignment with the screw holes of the cross bar (7) of the cycle carrier to receive the bolts (6) in said notches.

9. Arrangement according to claim 8, further including inserts (10) of yielding material at the inner portions of the U-clamps (2).

10. Arrangement according to claim 1, further including a cover plate (11) fitting over the space between the legs (4) of the clamps (2);
    and a projection extending approximately at right angles from the cover plate (11) and formed with lateral notches (13) located in alignment with the screw holes of the cross bar (7) of the cycle carrier to receive the bolts (6) in said notches.

* * * * *